(12) United States Patent
Huh et al.

(10) Patent No.: US 11,739,721 B2
(45) Date of Patent: Aug. 29, 2023

(54) METHOD OF CONTROLLING FOR ENGINE RUNNING

(71) Applicants: Hyundai Motor Company, Seoul (KR); Kia Motors Corporation, Seoul (KR)

(72) Inventors: Jee-Wook Huh, Gwangmyeong-si (KR); Chun-Hyuk Lee, Hwaseong-si (KR); Kyoung-Cheol Oh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 573 days.

(21) Appl. No.: 16/373,868

(22) Filed: Apr. 3, 2019

(65) Prior Publication Data
US 2019/0368459 A1 Dec. 5, 2019

(30) Foreign Application Priority Data

Jun. 4, 2018 (KR) .................... 10-2018-0064168

(51) Int. Cl.
*F02N 11/08* (2006.01)
*B60W 20/40* (2016.01)
(Continued)

(52) U.S. Cl.
CPC ............ *F02N 11/0862* (2013.01); *B60K 6/26* (2013.01); *B60K 6/387* (2013.01); *B60W 10/06* (2013.01); *B60W 10/26* (2013.01); *B60W 20/15* (2016.01); *B60W 20/40* (2013.01); *H02J 7/14* (2013.01); *B60W 2400/00* (2013.01);
(Continued)

(58) Field of Classification Search
CPC ........ F02N 11/0862; F02N 2200/0809; B60W 20/40; B60W 10/06; B60W 10/26; B60W 20/15; B60W 2540/10; B60W 2710/06; B60W 2400/00; B60W 2540/12; H02J 7/14; B60K 6/387; B60K 6/26; B60Y 2200/92; B60Y 2400/61; B60Y 2300/91
See application file for complete search history.

(56) References Cited

U.S. PATENT DOCUMENTS 9,469,292 B2   10/2016 Hisano
10,532,727 B2 *  1/2020 Lee ..................... B60W 10/06
(Continued)

FOREIGN PATENT DOCUMENTS

DE   102019108846 A1   12/2019
EP       3069948 A1    9/2016
(Continued)

OTHER PUBLICATIONS

German Patent and Trade Mark Office, Office Action dated Jun. 30, 2023 in Application No. 10 2019 108 846.1, 15 pages.

*Primary Examiner* — James M Mcpherson
*Assistant Examiner* — Kyle J Kingsland
(74) *Attorney, Agent, or Firm* — Slater Matsil, LLP

(57) ABSTRACT

A method can be used for controlling for engine running. An input unit receives required power data. A controller executes one among a first control for running an engine, a second control for keeping on running the engine, and a third control for stopping the engine, according to the required power data, to drive the engine. The battery is discharged or charged under control of the controller.

12 Claims, 7 Drawing Sheets

(51) Int. Cl.
  *B60W 10/06*  (2006.01)
  *B60W 10/26*  (2006.01)
  *H02J 7/14*  (2006.01)
  *B60K 6/387*  (2007.10)
  *B60K 6/26*  (2007.10)
  *B60W 20/15*  (2016.01)

(52) U.S. Cl.
  CPC ..... *B60W 2540/10* (2013.01); *B60W 2540/12* (2013.01); *B60W 2710/06* (2013.01); *B60Y 2200/92* (2013.01); *B60Y 2300/91* (2013.01); *B60Y 2400/61* (2013.01); *F02N 2200/0809* (2013.01)

(56) References Cited

U.S. PATENT DOCUMENTS

| | | | |
|---|---|---|---|
| 11,052,900 B2 * | 7/2021 | Shibata | B60W 30/18127 |
| 2014/0076104 A1 * | 3/2014 | Watanabe | B60W 20/11 |
| | | | 74/7 R |
| 2015/0101580 A1 * | 4/2015 | Sorge | F02D 41/0047 |
| | | | 123/568.21 |
| 2015/0307083 A1 | 10/2015 | Hisano | |
| 2016/0272190 A1 | 9/2016 | Morisaki | |
| 2019/0031176 A1 * | 1/2019 | Huh | B60W 10/08 |
| 2019/0368459 A1 | 12/2019 | Huh et al. | |

FOREIGN PATENT DOCUMENTS

| | | | |
|---|---|---|---|
| JP | 2015209153 A | 11/2015 | |
| KR | 20130090679 A | 8/2013 | |
| KR | 20160112993 A | 9/2016 | |

* cited by examiner

METHOD OF CONTROLLING FOR ENGINE RUNNING

CROSS-REFERENCE TO RELATED APPLICATIONS

This application claims priority to Korean Patent Application No. 10-2018-0064168, filed on Jun. 4, 2018, which application is hereby incorporated herein by reference.

TECHNICAL FIELD

Exemplary embodiments of the present invention relate to an engine control technology.

BACKGROUND

In general, even when driver power demand is large in a charge depleting (CD) mode, the efficiency is reduced when a vehicle is continuously driven in an electric vehicle (EV) mode. In addition, a distance and a time that the vehicle can travel in the EV mode are rapidly reduced, thus causing the driver discontent. Accordingly, this situation may be improved by automatically switching the CD mode to a charge sustaining (CS) mode to minimize power consumption of the EV mode, when the driver power demand is large.

However, there is an issue in that the automatic conversion of the CD mode to the CS mode is not optimized to the fuel efficiency. In detail, at engine on, when the engine is driven, battery charging/discharging is not considered. Therefore, it is difficult to perform an optimal control. Furthermore, since there is not a control for holding the engine on, the engine on is not held and thus the engine efficiency becomes lowered.

On the other hand, at engine off, when the driver power demand for the engine on is large, the driver power demand for engine off may also be typically large. In addition, when the driver frequently performs an acceleration operation, an engine-off control easily occurs. The easy engine off event raises a restart possibility, which causes a factor to worsen the fuel efficiency due to repetition of the engine on/off events.

SUMMARY

Exemplary embodiments of the present invention relate to an engine control technology. Particular embodiments relate to a vehicle and method for controlling an engine during traveling that determine an engine ON/OFF time and whether to hold engine ON/OFF to enable efficient engine driving.

An embodiment of the present invention is directed to a vehicle and method for controlling an engine during traveling which optimize a time of engine on to enable efficient driving of the engine.

Another embodiment of the present invention is directed to a vehicle and method for controlling an engine during traveling which minimizes the number of engine off events due to a variation of driver's temporary power demand, while an engine on is held.

Another embodiment of the present invention is directed to a vehicle and method for controlling an engine during traveling which differentiates a time of engine off from a time of engine on to minimize generation of fuel efficiency worsening factor caused by repetition of engine on/off events.

Advantages of the present invention can be understood by the following description, and become apparent with reference to the embodiments of the present invention. Also, it is obvious to those skilled in the art to which the present invention pertains that advantages of the present invention can be realized by the means as claimed and combinations thereof.

In accordance with an embodiment of the present invention, a vehicle can control an engine during traveling to minimize the number of engine restarts by minimizing the number of engine off events due to a variation of driver's temporary power demand, while an engine on is held.

The vehicle during traveling includes an input unit configured to receive required power data. A controller is configured to execute one among a first control for running an engine, a second control for keeping on running the engine, and a third control for stopping the engine according to the required power data, and to drive the engine. A battery is configured to be discharged or charged under control of the controller.

The first control may include temporarily switching a charging depleting (CD) mode in which power of the battery is consumed to a charge sustaining (CS) mode in which the battery power is sustained.

The CS mode may include, to prevent the power of the battery from deteriorating, at least one among full load region restriction, low torque region restriction, and driving in a maximum exhaust gas recirculation (EGR) application region.

The second control may include holding the engine-on state by delaying the engine off in preparation for re-acceleration in a state where there is not an acceleration input.

In the second control, when there is not any one of an acceleration input, an engine off request and a deceleration input, the engine-on state may be held and the charging may be performed.

The second control may be any one of an engine charge mode control in which the engine-on state is held while the engine holds power of a certain amount or higher to charge the battery, an engine fuel-cut control in which the engine-on state is held in a state without fuel injection, an engine zero torque control in which the engine-on state is held by offsetting an engine load with engine outputting zero torque, and an EGR ratio-considered engine torque control in which the engine-on state is held by driving the engine by power through which an engine efficiency is highest in terms of an EGR ratio.

In the second control, the engine clutch may remain engaged, the engine may be driven at a driving point of a high EGR ratio, and the battery may be charged by the driving motor.

The third control may be any one of a cumulative charge/discharge amount control for accumulating a charge/discharge amount and turning the engine off when the cumulative amount is equal to or greater than a preset reference amount, a cumulative charge amount control for accumulating a charge amount and turning the engine off when the cumulative amount is equal to or greater than a preset reference amount, an acceleration intention-considered cumulative charge amount control for accumulating a charge amount while there is an acceleration input and turning the engine off when the cumulative amount is a preset reference or greater, and a driver's brake pedal operation control for turning the engine off when there is a deceleration input.

The cumulative charge/discharge amount control may be to accumulate the charging/discharging energy on the basis of the driving motor in the engine-on state. When the charging energy of the battery is a preset reference level or higher, the engine may be turned off, or when battery state information is a preset reference level or higher, the engine may be turned off.

The cumulative charge amount control may be to accumulate the charging energy on the basis of the driving motor in the engine-on state. When the accumulated driving motor-charging energy is a preset reference level or higher, the engine is turned off. Alternatively, only when the charging is performed by the driving motor, the battery state information is accumulated, and when the accumulated battery state information is a preset reference level or higher, the engine is turned off.

The acceleration intention-considered cumulative charge amount control may be to accumulate charging energy due to an external factor on the basis of the engine in the engine-on state. When the accumulated charging energy is a preset reference level or higher, the engine is turned off. Alternatively, only when the charging is performed by the engine, the battery state information is accumulated, and when the accumulated battery state information is a preset reference level or higher, the engine is turned off.

The engine off is performed by a generator, and the generator is a Hybrid Starter Generator (HSG).

In accordance with an embodiment of the present invention, there is provided a method of controlling for engine running. The method includes receiving, by an input unit, required power data. A controller executes one among a first control for running the engine, a second control for keeping on running the engine, and a third control for stopping the engine, according to the required power data, to drive the engine. A batter is discharged or charge under control of the controller.

DETAILED DESCRIPTION OF ILLUSTRATIVE EMBODIMENTS

Figure 1:
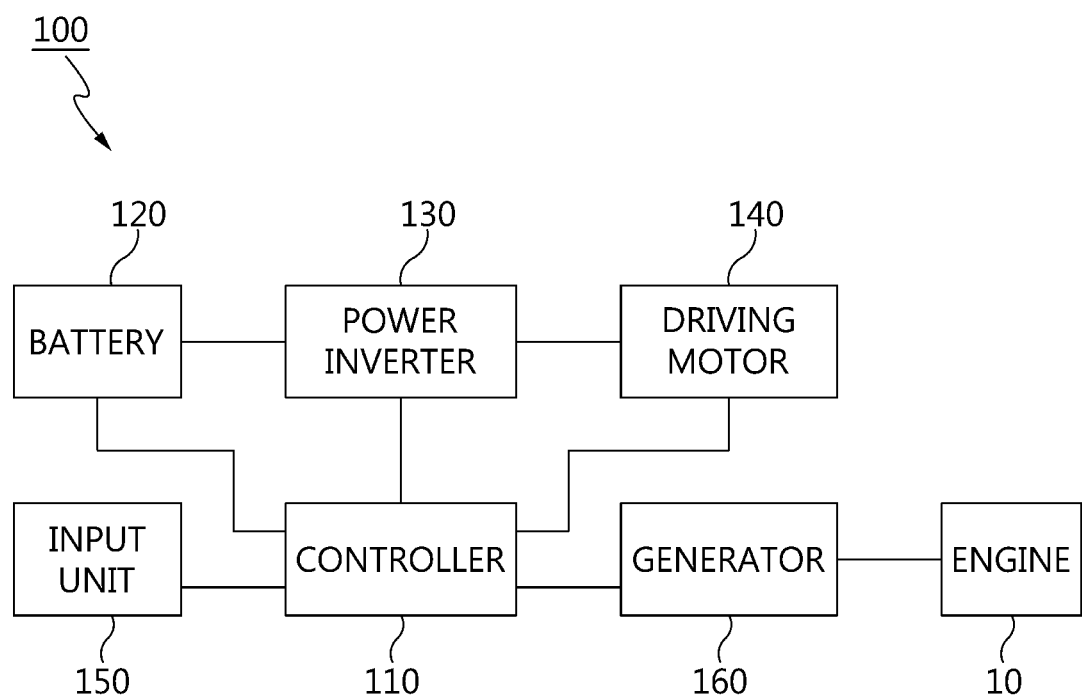
FIG. 1 is a block diagram illustrating the configuration of a device for controlling an engine during traveling according to an embodiment of the present invention.

Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention.

Like reference numerals refer to like parts throughout the various figures and embodiments of the present invention. It will be understood that, although the terms "first", "second", etc. may be used herein to describe various elements, these elements should not be limited by these terms. These terms are only used to distinguish one element from another element.

For instance, a first element discussed below could be termed a second element without departing from the teachings of the present invention. Similarly, the second element could also be termed the first element. The term "and/or" includes any and all combinations of one or more of the associated listed items.

Unless otherwise defined, all terms including technical and scientific terms used herein have the same meaning as commonly understood by one of ordinary skill in the art to which the present invention belongs.

It will be further understood that terms used herein should be interpreted as having a meaning that is consistent with their meaning in the context of this specification and the relevant art and will not be interpreted in an idealized or overly formal sense unless expressly so defined herein.

Hereinafter, a device and method for controlling an engine during traveling according to embodiments will be described in detail with reference to the attached drawings.

FIG. 1 is a block diagram illustrating the configuration of a device 100 for controlling an engine during traveling according to an embodiment of the present invention. Referring to FIG. 1, the device 100 for controlling an engine during traveling may include an engine 10, a controller 110, a battery 120, a power inverter 130, a driving motor 140, an input unit 150, and a generator 160.

The controller 110 receives required power data through the input unit 150. In addition, according the required power data, the controller 110 executes one of an engine-on control for engine running (i.e., engine on), an engine-on holding control for keeping on running the engine (i.e., holding engine on), and an engine-off control for stopping the engine (i.e., engine off), and drives the engine 10.

The controller no is connected to a hybrid control unit (HCU) or a vehicle control unit (VCU) to obtain traveling information, a vehicle speed, or regenerative braking information according to a brake operation, etc., of an echo-friendly vehicle. The controller 110 may be included in HCU, VCU, or the like. Here, as the eco-friendly vehicle, there are a Hybrid Electric Vehicle (HEV), a fuel cell vehicle, a fuel cell HEV, and the like.

The engine 10 may be an engine of Continuous Variable Valve Timing (CVVT), Double Over Head Camshaft (DOHC), Continuous Valve Timing (CVT), Gasoline Direct Injection (GDI), or Multi Point Injection (MPI), which uses gasoline fuel, an engine of Common Rail Direct Injection (CRDI), High direction Turbo Intercooler (HTI), Variable Geometry Turbocharge (VGT) which uses diesel fuel, or an engine of Liquid Propane injection (LPI) which uses gas fuel or the like.

The engine 10 is connected to the generator 160 through a connection means (not shown). Here, the connection means may be a belt, or a chain.

The generator 160 may be a Hybrid Starter and Generator (HSG). Accordingly, power is generated by starting the engine 10 or by receiving a torque from the engine 10. In detail, the generator 160 performs a function of collecting kinetic energy as electrical energy by regeneratively braking the electric vehicle when the vehicle is decelerated, besides having the purpose of driving an electric vehicle itself. In other words, the eco-friendly vehicle uses a portion of a brake force to generate electricity and uses the generated electrical energy to charge the battery. In detail, reduction in kinetic energy (namely, reduction in traveling speed) and electricity generation are substantially simultaneously implemented by using a portion of the kinetic energy obtained through the vehicle traveling speed as energy necessary for driving a generator. Such a braking scheme is referred to as regenerative braking (RB). At the time of the RB, the electrical energy may be generated by driving the generator 160.

The driving motor 140 performs a function of rotating wheels (not shown). In addition, the driving motor 140 may also generate electrical energy as described above. In the drawing, only the driving motor 140 is shown, but a motor control unit (MCU) may also be included.

The power inverter 130 may perform an inverter function. In other words, the power inverter 130 may invert generation power of three-phase AC power generated in the driving motor 140 and/or the generator 160 into DC power, and output the DC power, or in reverse, inverts DC power supplied from the battery 120 into three-phase AC power to provide the three-phase AC power to the driving motor 140 and/or the generator 160. Of course, it is also possible to configure the power inverter 130 in the driving motor 140 and the generator 160.

The battery 120 is configured from battery cells (not shown) arranged in series and/or in parallel, and this battery cell may be a high voltage battery for EV including a nickel metal battery, a lithium ion battery, a lithium polymer battery, a total solid battery, or the like. Typically, the high voltage battery is a battery used as a power source for moving the EV, and outputs a high voltage of 100 V or higher. However, the present invention is not limited thereto, and a low voltage battery may also be employed.

The battery cell may be designed as a cylindrical cell, a prismatic cell, a pouch cell, or the like. The pouch cell includes a flexible cover composed of a thin film, and inside the cover, electrical components of the battery cell are disposed. In order to implement an optimal use of the space in one battery cell, pouch cells are used in particular. The pouch cells are also characterized by high capacity and small weight.

Edges of such pouch cells include sealing joints (not shown). In detail, the joint connects two thin films of the battery cells and the thin films include additional components in a cavity part formed thereby.

The input unit 150 is formed of a circuit for processing required power data such as an acceleration input, a deceleration input or the like generated by an accelerator, a brake pedal or the like. A signal such as the acceleration input, the deceleration input or the like may also be generated by a direct input from the driver.

Figure 2:
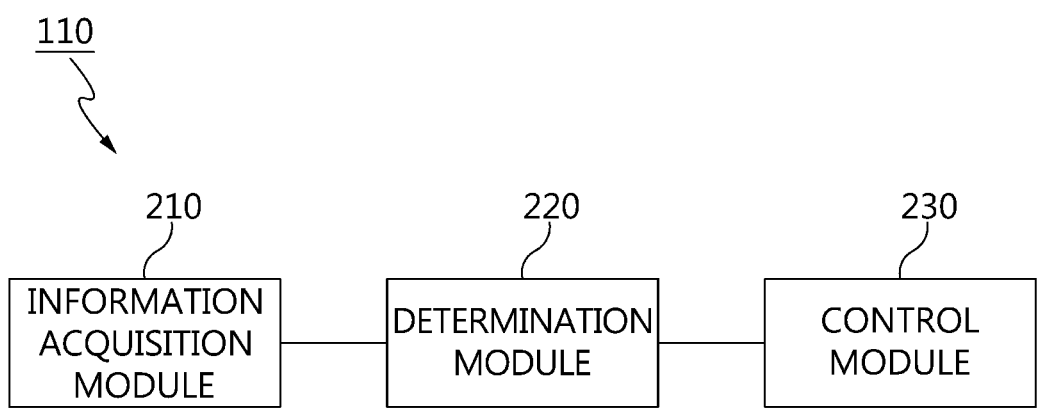
FIG. 2 is a detailed block diagram illustrating the controller shown in FIG. 1.

FIG. 2 is a detailed block diagram of the controller no illustrated in FIG. 1. Referring to FIG. 2, the controller 110 may include an information acquisition module 210 configured to acquire required power data such as the acceleration input, the deceleration input or the like, a determination module 220 configured to determine a control scheme to be executed from among an engine-on control for turning the engine on using the required power data, an engine on holding for holding the engine on, and an engine-off control for turning the engine off, and a control module 230 configured to execute a corresponding control according to the control of the controller 110.

The term "module" or the like in FIG. 2 means a unit configured to process at least one function or operation, and may be implemented by combining hardware and/or software. In the hardware implementation, the module may be implemented with an application specific integrated circuit (ASIC), a digital signal processor (DSP), a programmable logic device (PLD), a field programmable gate array (FPGA), a processor, a controller, a microprocessor, another electronic unit or a combination thereof. In the software implementation, the module may be implemented with a module configured to perform the above-described function. The software may be stored in a memory unit, and executed by a processor. The memory unit or the processor may adopt various kinds of means well known to a person skilled in the art.

Figure 3:
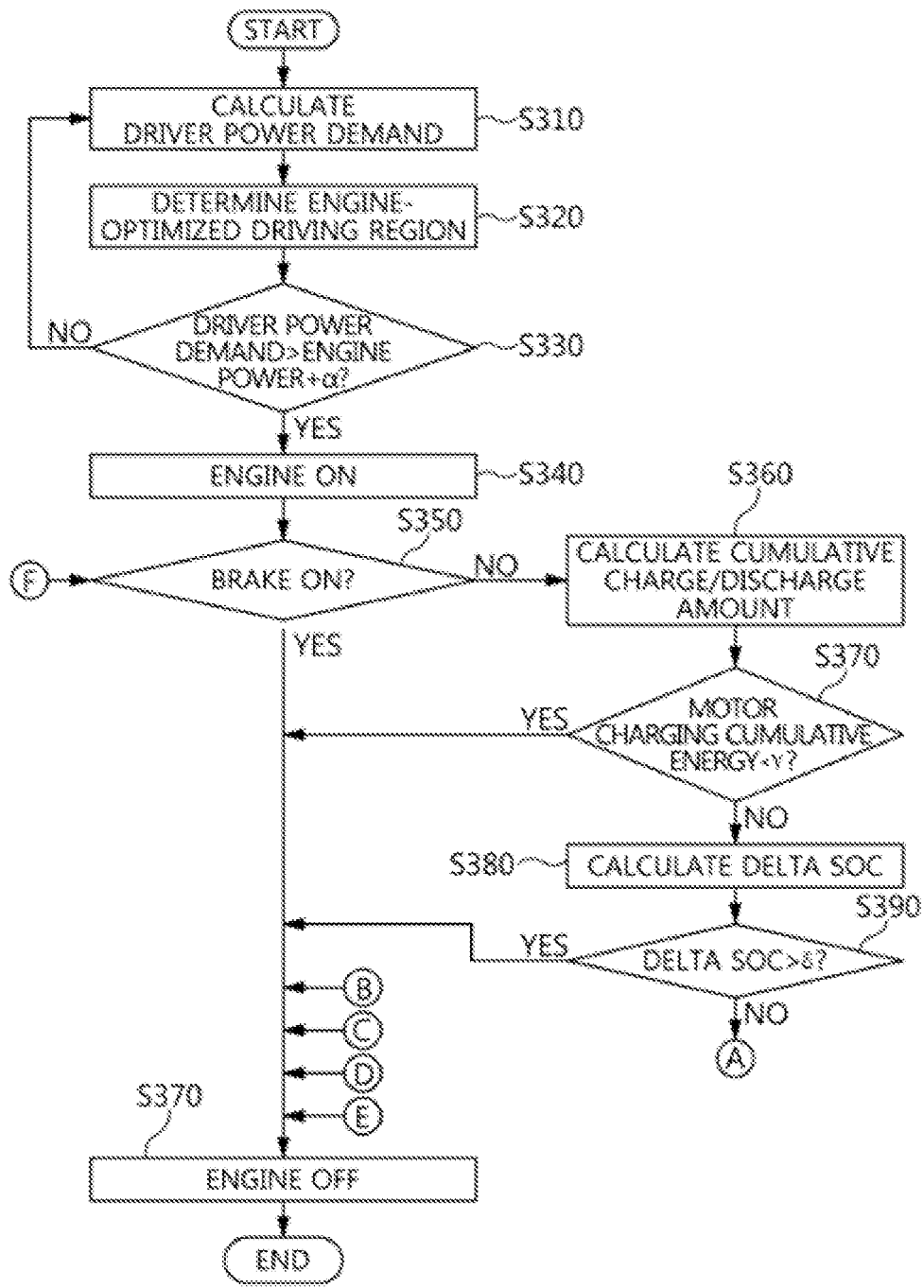
FIGS. 3 and 4 are flowcharts showing an engine control process of optimizing the efficiency of an engine during traveling according to an embodiment of the present invention.
Figure 4:
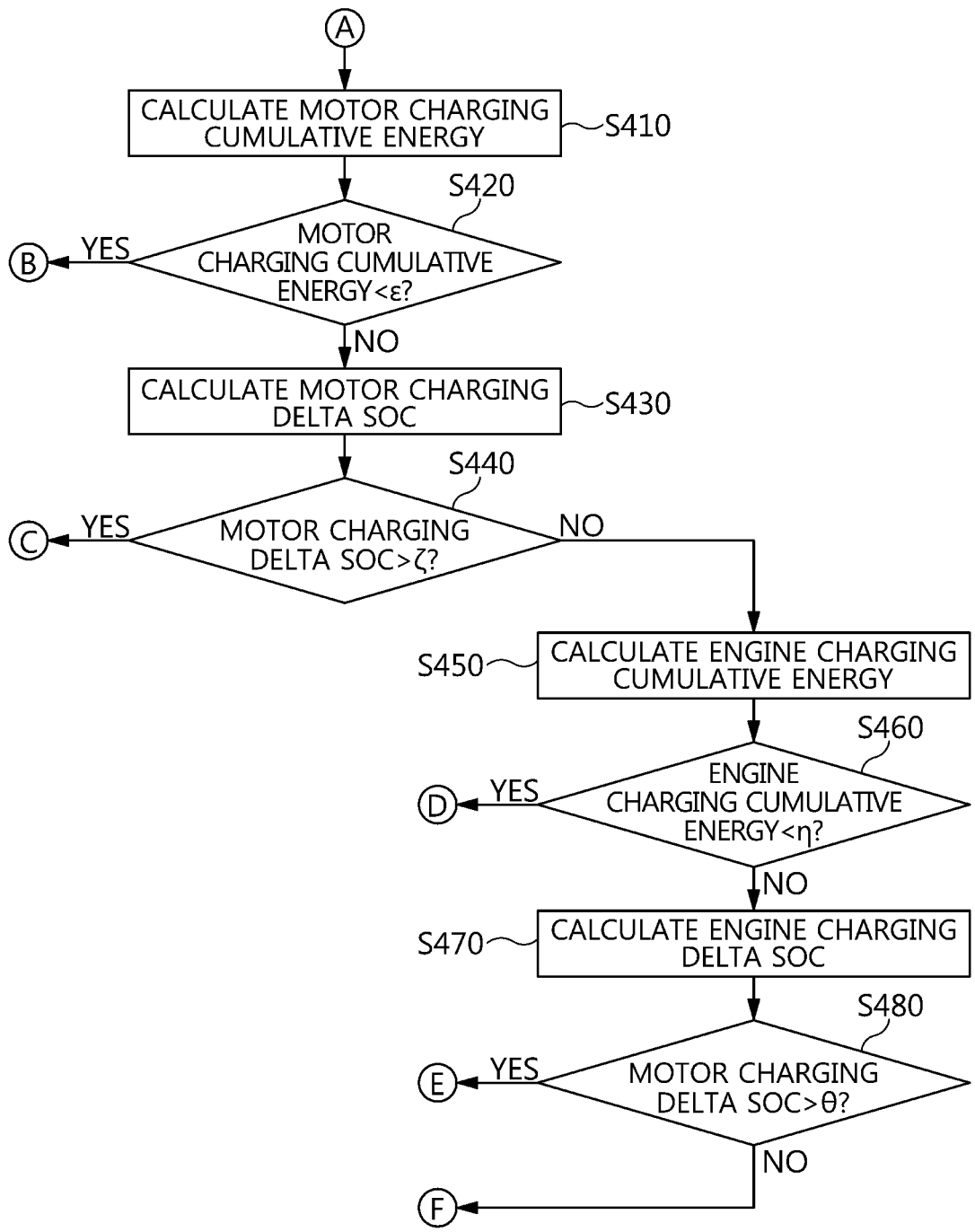

FIGS. 3 and 4 are flowcharts showing an engine control process for optimizing the efficiency of an engine during traveling according to an embodiment of the present invention. Referring to FIG. 3, when the required power data of a driver is input, a demand electricity amount is calculated and an engine-optimized driving region is determined (at steps S310, S320). In detail, the power demand of the driver may be calculated from an acceleration pedal operation by the driver. Accordingly, for the power demand of the driver and the current speed of the vehicle, the engine-optimized driving (power) region is determined (by considering the engine efficiency).

Then, whether to drive the engine 10 (of FIG. 1) is determined and then whether to turn the engine on is determined taking into account the engine efficiency (at step S330). In detail, whether the power demand is greater than a preset reference value (for example, engine power+α) is determined. Here, the engine power indicates power that the engine 10 may output in a current traveling state, and α is an arbitrary setting value set in advance.

At step S330, when the power demand is less than the reference value, the method proceeds to step S310. Otherwise, the engine-on control is executed (at step S340). When the driver power demand >(engine power+α), it is determined as a dischargeable mode and determined to be engine on.

Then, it is determined whether there is a deceleration input according to brake on (at step S350). When there is the deceleration input at step S350, an engine-off control is executed (at step S372).

Unlike this, at step S370, when there is not the brake on, the engine on or off control is executed. In other words, the controller 100 (of FIG. 1) calculates a cumulative charging/discharging amount by the driving motor 140 (of FIG. 1) at step S360. In other words, since the cumulative charging/discharging amount reflects battery state information, it is intuitive and convenient for the driver to understand. The battery state information may be a state of charge (SOC). Of course, besides the SOC, there may be also a State Of Health (SOH), a Depth Of Discharging (DOD) and a State Of Function (SOF). Hereinafter, the SOC will be described.

① Cumulative charging/discharging amount calculation: charging/discharging energy is accumulated on the basis of a motor at engine on, and then when the charging energy is a certain level or higher, then engine-off control is performed. In other words, when the cumulative charging/discharging energy of the motor<γ, it is determined that a lot of charging is performed (at steps S370 and S372).

② SOC difference calculation (step S380): when charging is performed such that the SOC is a certain level or higher, the engine-off control is performed. In other words, when Delta SOC>δ, it is determined a large amount of charging is performed. Here, δ denotes an arbitrary set value.

Referring FIG. 4, when the SOC is not charged to the certain level or higher at step S390, a control is performed by the driving motor using the cumulative charging energy. In other words, for the charging depleting (CD) mode, charging is performed by the engine. In this case, in an aspect of the cost, it is disadvantageous in comparison to the electricity charged through a plug (not shown), and thus only the charging energy is considered.

① Cumulative charging energy calculation: the charging energy is accumulated on the basis of the driving motor at engine on, and then when the charged amount is a certain level or greater, the engine-off control is performed. In other words, when the cumulative charging energy of the motor<ε, it is determined that a lot of charging is performed (at steps S410, S420, and S372). Here, ε denotes an arbitrary set value.

② SOC difference calculation: the SOC is accumulated only when charging is performed through the driving motor 140 (of FIG. 1), and when the charging is performed up to a certain level or higher, the engine-off control is performed. In other words, when Delta SOC>ζ, it is determined a lot of charging is performed (at steps S430, S440, and S372). Here, ζ denotes an arbitrary set value.

Thereafter, a control is executed using the cumulative charging energy in consideration of the engine power. In other words, only when charging is performed from the engine 10, the charging energy is accumulated. Since external energy caused by an external factor such as regenerative braking is not inefficient charging, only the energy charged from the engine in an inefficient charging manner is accumulated.

① Cumulative charging energy calculation in consideration of the engine power: the charging energy is accumulated on the basis of the engine at engine on, and when a charged amount is a certain level or greater, the engine-off control is performed. In other words, when the cumulative charging energy<η, it is determined that a lot of charging is performed (at steps S450, S460, and S372). Here, η denotes an arbitrary set value.

② SOC difference calculation: the SOC is accumulated only when charging is performed by the engine 10, and when the charging is performed equal to or greater than a certain level, the engine-off control is performed. In other words, when engine charging Delta SOC>θ, it is determined a lot of charging is performed (at steps S470, S480, and S372). When it is not that the engine charging Delta SOC>θ at step S480, it is not considered that a lot of charging is performed. Therefore, steps S350 to step S480 are performed again.

Figure 5:
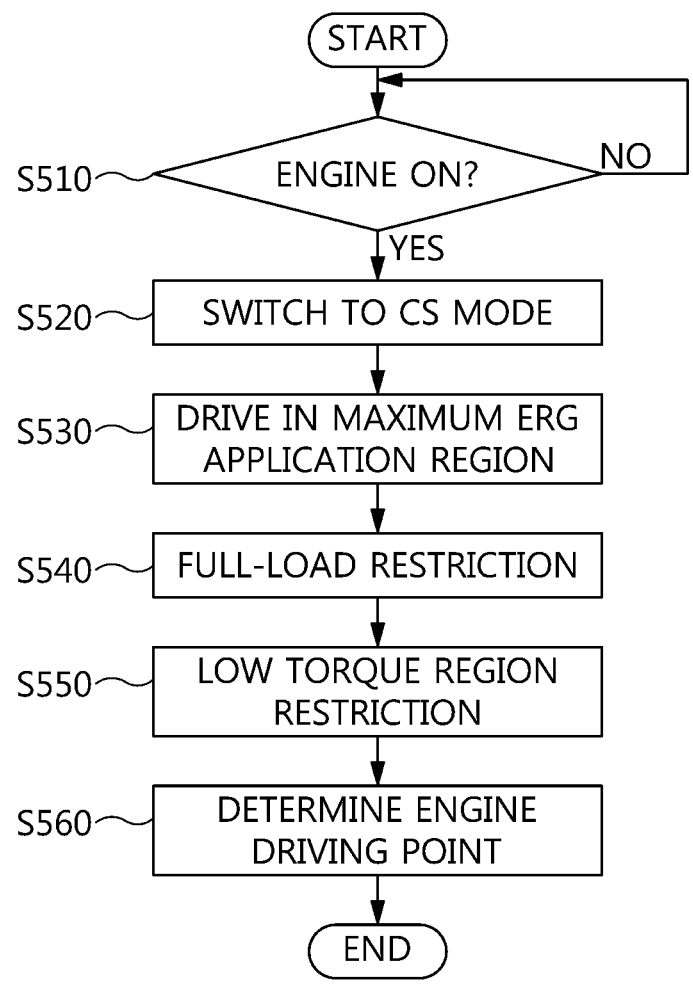
FIG. 5 is a flowchart illustrating an engine-on control process according to an embodiment of the present invention.

FIG. 5 is a flowchart illustrating an engine-on control process according to an embodiment of the present invention. Referring to FIG. 5, when the engine-on control is executed, the CD mode is switched to a Charge Sustaining (CS) mode (at steps S510 and S520).

Since the CD mode is temporarily switched to the CS mode, a control to raise the battery's SOC is required to be minimized so as to maximize the fuel efficiency. In addition, the engine power may use exhaust gas recirculation (EGR) as much as possible, and use an engine power region in which the engine efficiency is high. This engine power region is a region used for preventing the fuel efficiency from being lowered due to lowering of the battery's SOC in a typical CS mode.

In the CS mode, driving in a maximum EGR application region, full load region restriction, low torque region restriction and the like are executed so that the power of the battery 120 is not lowered, and accordingly, an engine driving point is determined (at steps S530, S540, S550, and S560).

Figure 6:
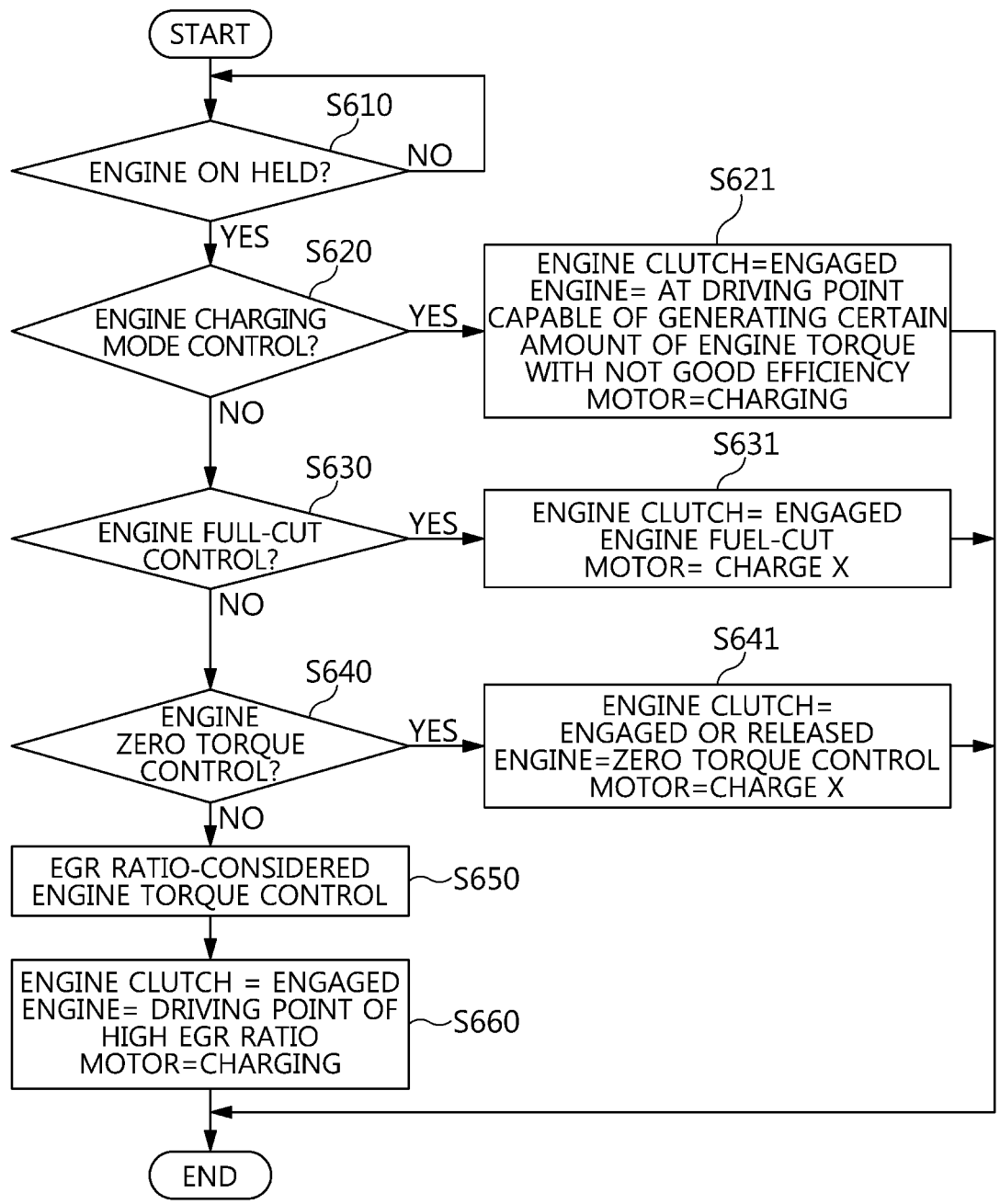
FIG. 6 is a flowchart illustrating an engine-on holding control process according to an embodiment of the present invention.

FIG. 6 is a flowchart illustrating an engine-on holding control process according to an embodiment of the present invention. Referring to FIG. 6, the engine-on holding control delays an engine off in preparation for re-acceleration in a state where there is not an acceleration input so as to hold the engine on. Accordingly, when there is not an acceleration input, an engine off request, a deceleration input or the like, the engine on is held to perform charging as shown by set S610. When the engine-on holding control is executed, it is determined whether to execute an engine charging mode control in which the engine 10 maintains power at a certain level or higher, while the battery is charged and the engine on is held (at step S620). In this case, while the engine on is held, a manner in which the engine power is generated to charge the battery is advantageous in SOC defense and frequent engine on/off events may be prevented. But the engine efficiency is lowered and the system efficiency is reduced in a situation where the SOC is sufficient. In other words, it is the case where there is not or nearly not the user power demand, but the engine power is generated to be transmitted to the driving motor 140, and the energy generated in the driving motor 140 is used for charging the battery 120.

At step S620, for the engine charging mode control, an engine clutch (not shown) is engaged, and the engine 10 is operated at a driving point at which an engine torque is generated for a constant amount in the low efficiency, and the driving motor 140 executes charging (at step S621).

Unlike this, if not the engine charging mode control at step S620, it is determined whether to execute an engine fuel-cut control for holding the engine-on state in a state where there is not a fuel injection (at step S630). The engine fuel-cut control is advantageous in that at the time of holding engine on, the frequent engine on/off events may be prevented with a control that the engine does not consume the fuel through the fuel-cut control. However, it is disadvantageous in that frictional resistance of the engine is activated to reduce energy collectable by the motor through the regenerative braking, and drivability may be deteriorated. For the engine fuel-cut control, a control is performed in a state where the engine clutch is engaged, the engine is turned on, and the fuel is not injected. In addition, the charging is not executed by the driving motor (at step S631).

When the engine fuel-cut control is not executed, it is determined whether to execute an engine zero torque control in which an engine load is offset by letting the engine generate zero torque so as to hold the engine-on state (at step S640). During holding the engine on, for the engine zero torque control, the engine does not affect the regenerative braking and the drivability through the zero torque control and may prevent the frequent engine on/off events. However, for the zero torque control of the engine 10, the engine 10 is required to inject the fuel in an idle state or a part load state, which results lowering of the engine efficiency. For the engine zero torque control, the engine power is generated as much as the engine frictional resistance in a state where the clutch is engaged and the engine is turned on, and charging is not executed by the driving motor (at step S641).

At step S640, when the engine zero torque is not executed, an EGR ratio-considered engine torque control is executed in which the engine is driven by the power through which the engine efficiency is highest in terms of an EGR ratio (at step S650). For the EGR ratio-considered engine torque control, during holding the engine on, it is advantageous in SOC defense in a manner of charging the battery by generating engine power in a region in which the engine efficiency is good and the EGR ratio is high. In addition, it is also advantageous in that the frequent engine on/off events may be prevented and the engine efficiency is very good. However, in an aspect of the entire system, there are much charging and discharging amounts, which may cause a deterioration factor. In addition, it is disadvantageous in an aspect of the drivability such as engine booming, knocking, inaccurate engine torque or the like.

Accordingly, even though there is not or nearly not the driver power demand, the energy generated by the driving motor is used for charging the battery by driving the engine power in a region where the EGR ratio is high and by maintaining a state of the engine clutch engaged (at step S660).

Figure 7:
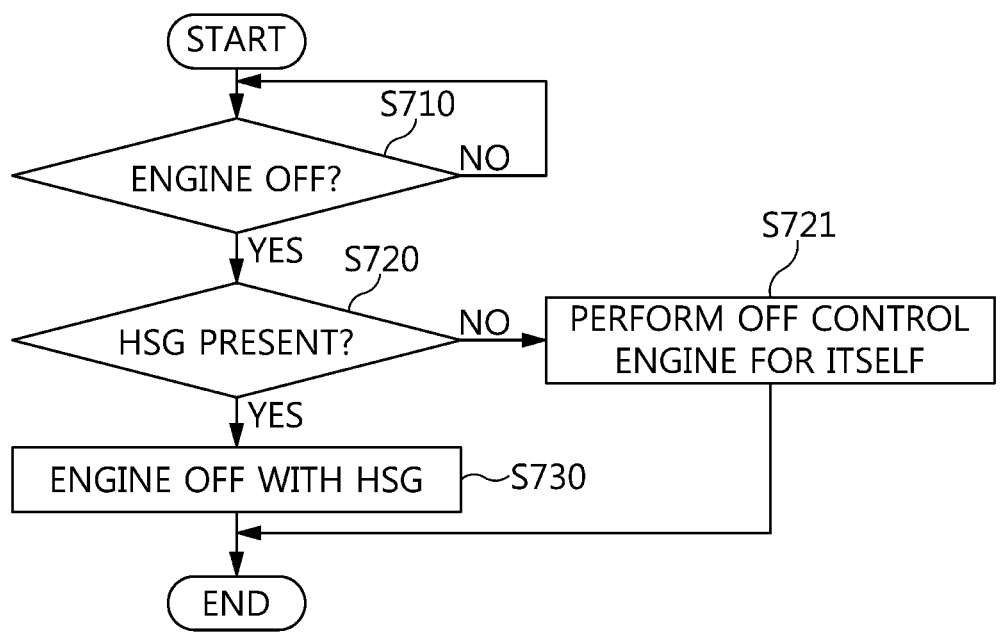
FIG. 7 is a flowchart illustrating an engine-off control process according to an embodiment of the present invention.

FIG. 7 is a flowchart illustrating an engine-off control process according to an embodiment of the present invention. Referring to FIG. 7, when the engine-off control is executed, it is determined whether a Hybrid Starter-Generator (HSG) 160 (of FIG. 1) is present (at steps S710 and S720).

When the HSG is present, it is advantageous to the fuel efficiency because the energy is charged while the engine off is performed using the HSG (at S730).

Unlike this, at step S720, for the case without the HSG, the charging is not performed by performing the off control for the engine itself or by turning the engine off through another resistance factor (at step S721).

Furthermore, the methods or the steps of algorithm described with reference to the embodiments proposed in this specification may be implemented in the form of program instructions executable through various computer systems and may be recorded in a computer-readable medium. The computer-readable medium may also include program (instruction) codes, data files, data structures, and the like independently or in the form of combination.

The program (instruction) codes recorded in the medium may be specially designed and constructed for the present invention, or may be well-known and available to those skilled in the computer software arts. Examples of the computer-readable medium may include magnetic media such as hard disks, floppy disks, and magnetic tape; optical media such as CD ROM disks, DVD, Blu-ray disks; and semiconductor memory devices such as read-only memory (ROM), random access memory (RAM), and flash memory, which are specialized to store and perform program (instruction) codes.

Examples of program (instruction) codes may include not only machine codes produced by a compiler but also high-level language codes capable of being executed by a computer using an interpreter or the like. The described hardware devices may be configured to operate as one or more modules or units to perform the operations of the above-described embodiments, and vice versa.

According to the present invention, the fuel efficiency may be improved about 4.5%, and the maintenance cost may be improved about 15%.

In addition, there are issues in the existing control manner that since traveling is executed through a driving motor at a high speed and with a heavy load, not only a traveling distance of an EV is short, but a traveling time of the EV is also remarkably reduced. The present invention addresses such issues to enable the driver to maximally use the vehicle in an aspect of drivability and sensitivity.

Furthermore, the traveling time and distance of the EV increase to improve the fuel efficiency in an aspect of sensitivity, which is more than an effect of actual improvement of the fuel efficiency. Accordingly, it is possible to improve merchantability.

In addition, since electric charging is cheaper than fueling of gasoline, it is advantageous for the driver in maintenance cost.

While the present invention has been described with respect to the specific embodiments, it will be apparent to those skilled in the art that various changes and modifications may be made without departing from the spirit and scope of the invention as defined in the following claims.

What is claimed is:

1. A method of controlling running of an engine, the method comprising:
   receiving, by an input unit, required power data;
   executing, by a controller, one among a first control for running the engine, a second control for keeping on running the engine, and a third control for stopping the engine, each of the first, and third controls being executed according to the required power data; and
   discharging or charging a battery under control of the controller;
   wherein, when a power demand is less than a reference value, the first control is executed by temporarily switching a charge depleting (CD) mode in which battery power of the battery is consumed to a charge sustaining (CS) mode in which the battery power is sustained;
   wherein, when any one of an acceleration input, an engine off request, and a deceleration input is absent, the second control is executed by holding an engine-on state by delaying the engine off in preparation for re-acceleration in a state where there is not an acceleration input;
   wherein the second control comprises any one of an engine charge mode control in which the engine-on state is held while the engine holds power of a certain amount or higher to charge the battery, an engine fuel-cut control in which the engine-on state is held in a state without fuel injection, an engine zero torque control in which the engine-on state is held by offsetting an engine load with engine outputting zero torque, and an exhaust gas recirculation (EGR) ratio-considered engine torque control in which the engine-on state is held by driving the engine by power through which an engine efficiency is highest in terms of an EGR ratio;
   wherein in the second control, the engine-on state is held and the charging is performed, an engine clutch remains engaged, the engine is driven at a driving point selected to achieve a predetermined EGR ratio and to generate an engine torque for a constant amount, and the battery is charged by a driving motor; and
   wherein the third control comprises selectively and sequentially performing:
      a cumulative charge/discharge amount control, when there is no deceleration input, for accumulating a charge/discharge amount and turning the engine off when the cumulative charge/discharge amount is equal to or greater than a first preset reference amount;
      a cumulative charge amount control, when a state of charge (SOC) of the battery is not charged to a certain level, for accumulating a charge amount and turning the engine off when the cumulative charge amount is equal to or greater than a second preset reference amount; and an acceleration intention-considered cumulative charge amount control for accumulating an acceleration intention-considered charge amount while there is an acceleration input and turning the engine off when the acceleration intention-considered charge cumulative amount is a second preset reference or greater.

2. The method of claim 1, wherein the CS mode includes at least one among full load region restriction, low torque region restriction, or driving in a maximum exhaust gas recirculation (EGR) application region.

3. The method of claim 2, wherein the CS mode is designed to prevent the power of the battery from deteriorating.

4. A vehicle comprising:
an engine;
a battery;
an input unit; and
a controller configured to execute one among a first control for running the engine, a second control for keeping on running the engine, and a third control for stopping the engine, each of the first, and third controls being executed according to required power data received from the input unit, the controller further configured cause a discharge or charge of the battery,
wherein when a power demand is less than a reference value the first control is executed by temporarily switching a charge depleting (CD) mode in which power of the battery is consumed to a charge sustaining (CS) mode in which the battery power is sustained,
wherein, when any one of an acceleration input, an engine off request, and a deceleration input is absent, the second control is executed by holding an engine-on state by delaying the engine off in preparation for re-acceleration in a state where there is not an acceleration input,
wherein the second control comprises any one of an engine charge mode control in which the engine-on state is held while the engine holds power of a certain amount or higher to charge the battery, an engine fuel-cut control in which the engine-on state is held in a state without fuel injection, an engine zero torque control in which the engine-on state is held by offsetting an engine load with engine outputting zero torque, and an exhaust gas recirculation (EGR) ratio-considered engine torque control in which the engine-on state is held by driving the engine by power through which an engine efficiency is highest in terms of an EGR ratio,
wherein in the second control, the engine-on state is held and the charging is performed, an engine clutch remains engaged, the engine is driven at a driving point selected to achieve a predetermined EGR ratio and to generate an engine torque for a constant amount, and the battery is charged by a driving motor, and
wherein the third control comprises selectively and sequentially performing:
a cumulative charge/discharge amount control, when there is no deceleration input, for accumulating a charge/discharge amount and turning the engine off when the cumulative charge/discharge amount is equal to or greater than a first preset reference amount;
a cumulative charge amount control, when a state of charge (SOC) of the battery is not charged to a certain level, for accumulating a charge amount and turning the engine off when the cumulative charge amount is equal to or greater than a second preset reference amount; and an acceleration intention-considered cumulative charge amount control for accumulating an acceleration intention-considered charge amount while there is an acceleration input and turning the engine off when the acceleration intention-considered charge cumulative amount is a second preset reference or greater.

5. The vehicle of claim 4, further comprising a driving motor, wherein the battery is configured to be charged by the driving motor.

6. The vehicle of claim 4, further comprising:
a driving motor coupled to the controller;
a generator coupled to the controller; and
a power device configured to convert generation power of three-phase AC power generated in the driving motor or the generator into DC power or to invert DC power supplied from the battery into three-phase AC power to provide three-phase AC power to the driving motor or the generator.

7. The vehicle of claim 4, wherein the CS mode includes at least one among full load region restriction, low torque region restriction, or driving in a maximum exhaust gas recirculation (EGR) application region.

8. The vehicle of claim 4, wherein executing the second control comprises keeping on running the engine by delaying the engine off in preparation for re-acceleration in a state where there is not an acceleration input.

9. The vehicle of claim 5, wherein the driving motor is coupled to the controller, the vehicle further comprising:
a generator coupled to the controller; and
a power device configured to convert generation power of three-phase AC power generated in the driving motor or the generator into DC power or to invert DC power supplied from the battery into three-phase AC power to provide three-phase AC power to the driving motor or the generator.

10. The vehicle of claim 5, wherein the CS mode includes at least one among full load region restriction, low torque region restriction, or driving in a maximum exhaust gas recirculation (EGR) application region.

11. The vehicle of claim 5, wherein executing the second control comprises keeping on running the engine by delaying the engine off in preparation for re-acceleration in a state where there is not an acceleration input.

12. A method of controlling running of an engine, the method comprising:
receiving required power data;
executing, by a controller, one among a first control for running the engine, a second control for keeping on running the engine, and a third control for stopping the engine according to the required power data; and
discharging or charging a battery under control of the controller;
wherein, when a power demand is less than a reference value the first control is executed by temporarily switching a charge depleting (CD) mode in which battery power of the battery is consumed to a charge sustaining (CS) mode in which the battery power is sustained;
wherein the CS mode includes at least one among full load region restriction, low torque region restriction, or driving in a maximum exhaust gas recirculation (EGR) application region;
wherein the CS mode is designed to prevent the battery power of the battery from deteriorating;
wherein, when any one of an acceleration input, an engine off request, and a deceleration input is absent, the second control is executed by holding an engine-on state by delaying the engine off in preparation for re-acceleration in a state where there is not an acceleration input;

wherein, in the second control, the engine-on state is held and the charging is performed;

wherein the second control comprises any one of an engine charge mode control in which the engine-on state is held while the engine holds power of a certain amount or higher to charge the battery, an engine fuel-cut control in which the engine-on state is held in a state without fuel injection, an engine zero torque control in which the engine-on state is held by offsetting an engine load with engine outputting zero torque, and an EGR ratio-considered engine torque control in which the engine-on state is held by driving the engine by power through which an engine efficiency is highest in terms of an EGR ratio;

wherein in the second control, an engine clutch remains engaged, the engine is driven at a driving point selected to achieve a predetermined EGR ratio and to generate an engine torque for a constant amount, and the battery is charged by a driving motor; and wherein the third control comprises selectively and sequentially performing:

a cumulative charge/discharge amount control, when there is no deceleration input, for accumulating a charge/discharge amount and turning the engine off when the cumulative charge/discharge amount is equal to or greater than a first preset reference amount;

a cumulative charge amount control, when a state of charge (SOC) of the battery is not charged to a certain level, for accumulating a charge amount and turning the engine off when the cumulative charge amount is equal to or greater than a second preset reference amount; and an acceleration intention-considered cumulative charge amount control for accumulating an acceleration intention-considered charge amount while there is an acceleration input and turning the engine off when the acceleration intention-considered charge cumulative amount is a second preset reference or greater.

* * * * *